United States Patent
Prathapan et al.

(10) Patent No.: US 8,842,766 B2
(45) Date of Patent: Sep. 23, 2014

(54) APPARATUS AND METHOD FOR REDUCING INTERFERENCE SIGNALS IN AN INTEGRATED CIRCUIT USING MULTIPHASE CLOCKS

(75) Inventors: Indu Prathapan, Bangalore (IN); Anjana Ghosh, Bangalore (IN); Diganta Baishya, Bangalore (IN); Sundarrajan Rangachari, Trichy (IN); Sankar Prasad Debnath, Bangalore (IN); Ranjit Kumar Dash, Chennai (IN); Srinath Mathur Ramaswamy, Palakkad (IN)

(73) Assignee: Texas Instruments Incorporated, Dallas, TX (US)

( * ) Notice: Subject to any disclaimer, the term of this patent is extended or adjusted under 35 U.S.C. 154(b) by 761 days.

(21) Appl. No.: 12/752,082

(22) Filed: Mar. 31, 2010

(65) Prior Publication Data

US 2011/0241747 A1    Oct. 6, 2011

(51) Int. Cl.
   *G06F 1/04*   (2006.01)
   *G06F 1/10*   (2006.01)
   *G06F 1/06*   (2006.01)
   *H04B 15/00*  (2006.01)
   *H04B 1/00*   (2006.01)
   *H04L 27/10*  (2006.01)
   *H03D 1/04*   (2006.01)

(52) U.S. Cl.
   CPC ... G06F 1/06 (2013.01); G06F 1/10 (2013.01)

USPC ........... 375/285; 375/144; 375/284; 375/346; 375/348; 327/291; 327/296

(58) Field of Classification Search
   USPC ................... 375/260–285, 316–352
   See application file for complete search history.

(56) References Cited

U.S. PATENT DOCUMENTS

| | | | | |
|---|---|---|---|---|
| 5,471,165 A | * | 11/1995 | Liedberg | 327/250 |
| 6,225,937 B1 | * | 5/2001 | Butler | 341/169 |
| 2005/0225464 A1 | * | 10/2005 | Lin et al. | 341/144 |
| 2005/0265486 A1 | * | 12/2005 | Crawley | 375/326 |

* cited by examiner

*Primary Examiner* — Shuwang Liu
*Assistant Examiner* — Ross Varndell
(74) *Attorney, Agent, or Firm* — Frederick J. Telecky, Jr.

(57) ABSTRACT

An apparatus and method for reducing interference signals using multiphase clocks. An integrated circuit includes a digital circuit and an analog circuit. The digital circuit includes a derived clock circuit configured to receive a root clock having a frequency $D*f$, D being a divide factor, to divide the root clock by D, and generate multiphase clocks having N phases. N circuits of the digital circuit are configured to receive a corresponding one of the N phases, with edges of the multiphase clocks being spread over the N phases. The multiphase clocks cause a frequency shift in interference signals generated by reduced periodic peak currents drawn by the N circuits from f to $N*f$ and harmonics thereof. The analog circuit receives an in-band range of signals. A value of N is configured to shift the interference signals outside the in-band range of signals.

11 Claims, 9 Drawing Sheets

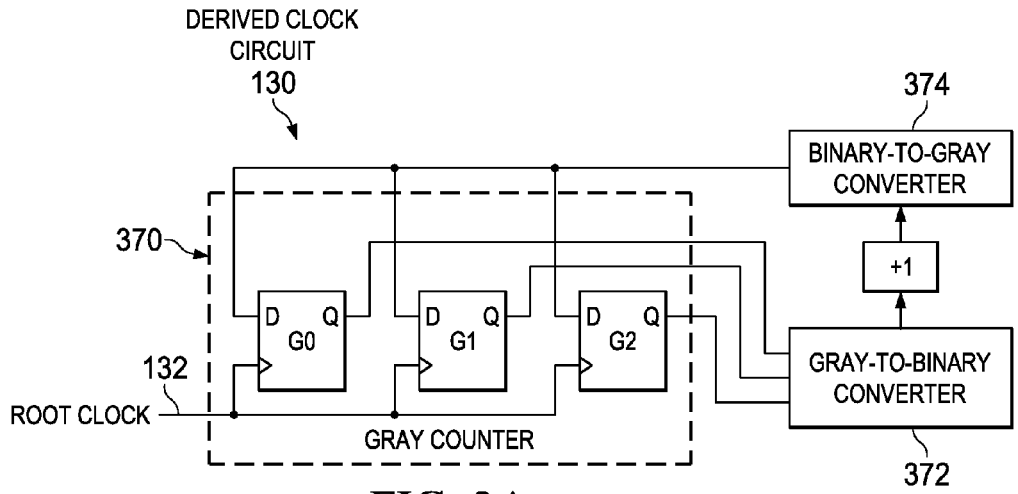
FIG. 3A
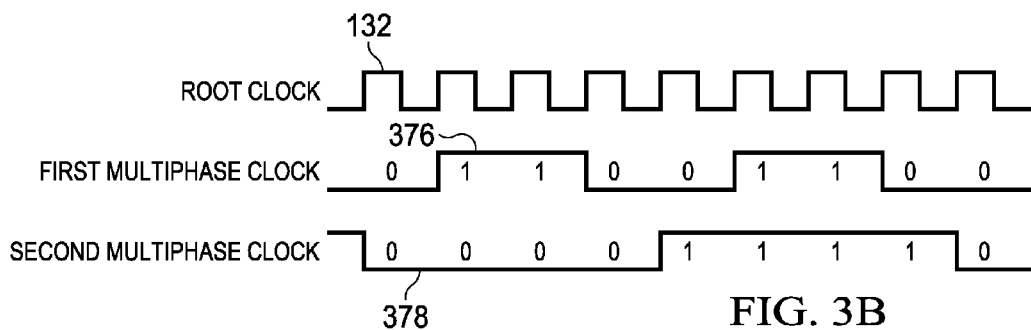
FIG. 3B
| BINARY COUNTER | | | GRAY COUNTER | | |
|---|---|---|---|---|---|
| B2 | B1 | B0 | G2 | G1 | G0 |
| 0 | 0 | 0 | 0 | 0 | 0 |
| 0 | 0 | 1 | 0 | 1 | 0 |
| 0 | 1 | 0 | 0 | 1 | 1 |
| 0 | 1 | 1 | 0 | 0 | 1 |
| 1 | 0 | 0 | 1 | 0 | 1 |
| 1 | 0 | 1 | 1 | 1 | 1 |
| 1 | 1 | 0 | 1 | 1 | 0 |
| 1 | 1 | 1 | 1 | 0 | 0 |
FIG. 3C  378  376

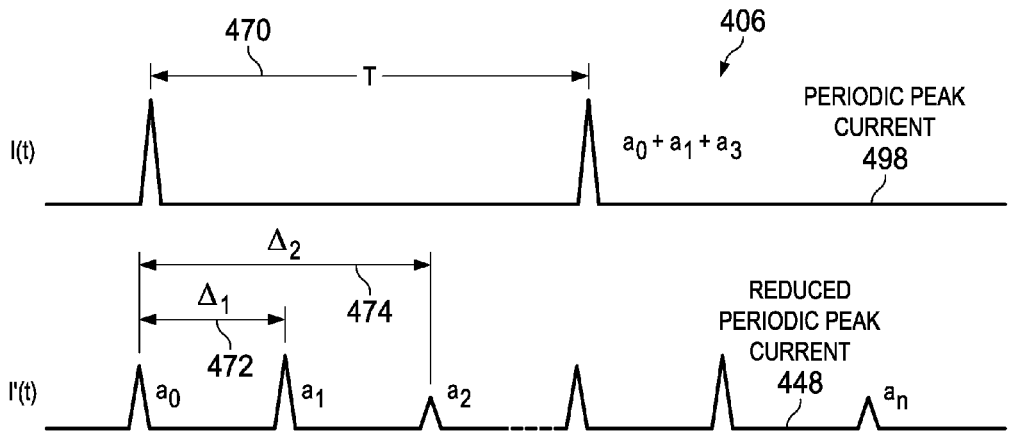
FIG. 4E
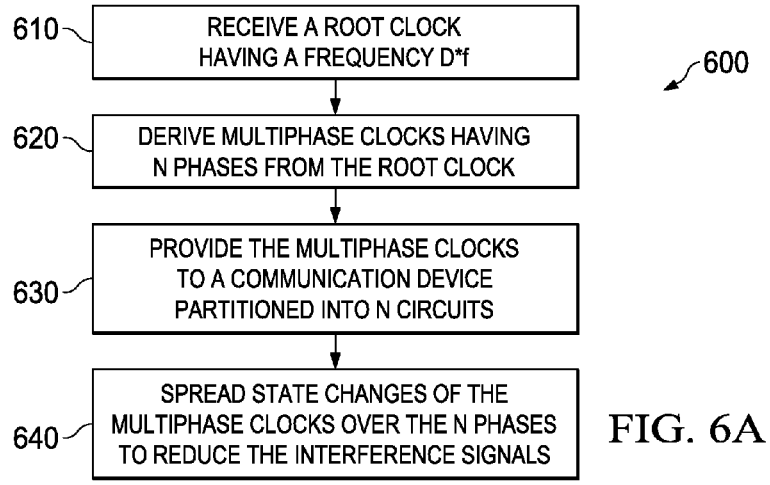
FIG. 6A
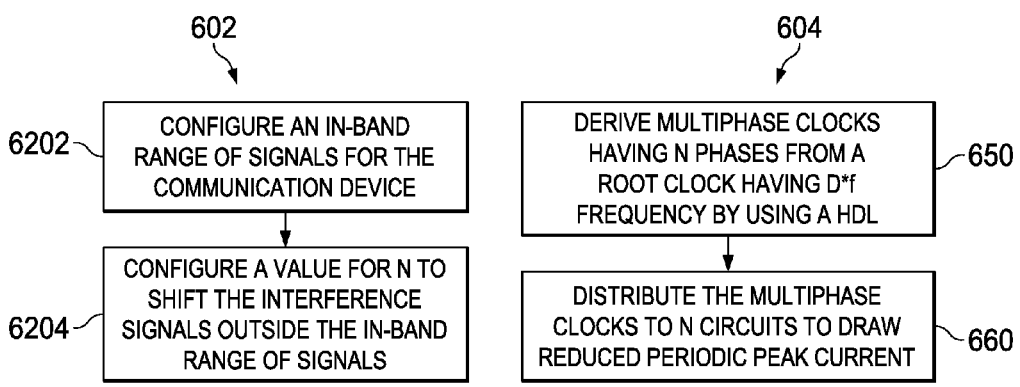
FIG. 6B
FIG. 6C

US 8,842,766 B2

APPARATUS AND METHOD FOR REDUCING INTERFERENCE SIGNALS IN AN INTEGRATED CIRCUIT USING MULTIPHASE CLOCKS

TECHNICAL FIELD

Embodiments of the disclosure generally relates to the field of integrated circuits (ICs), and more particularly to an improved method and apparatus for clock design and distribution in ICs.

BACKGROUND

Typically, many ICs are driven by clocks for performing various operations in large digital circuits that may include logic gates, flip-flops (FFs), input/output buffers, and others. Switching activity of these large digital circuits may result in switching components included in these large digital circuits drawing an undesirable, large periodic peak current, especially when the switching activity is concurrently triggered by a leading (or trailing edge) of the clock. The large periodic peak current may generate an IR drop in a local power supply network providing power to the ICs. This IR drop may result in degraded timing performance of the ICs. In addition, in an IC design that includes mixed (analog and digital) signals, a large periodic peak current (and the resulting IR drop) may generate undesirable interference signals in mixed signal processing circuits that may degrade the performance of the IC.

Traditional techniques such as placing local decoupling capacitors (decaps) to filter the interference signals may be used to mitigate the effects of peak currents on the performance of the IC. However, many of these techniques may also require a significant increase in silicon area required to fabricate the IC. In addition, larger sized decaps may also increase leakage current.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

Methods and apparatus for reducing interference signals in an integrated circuit using multiphase clocks are disclosed. In one aspect, an IC for reducing interference signals includes a digital circuit and an analog circuit. The digital circuit includes a derived clock circuit configured to receive a root clock having a frequency $D*f$, D being a divide factor and * indicating a multiplication. The derived clock circuit is configured to divide the root clock by D and generate multiphase clocks having N phases, N and D being integers. The multiphase clocks cause a shift in interference signals to have a frequency $N*f$ and harmonics thereof. The digital circuit also includes N circuits configured to receive a corresponding one of the multiphase clocks. Edges of the multiphase clocks provided to the N circuits are spread over the N phases. The interference signals having the frequency $N*f$ and harmonics thereof, are generated by a reduced periodic peak current drawn by the N circuits. The analog circuit is configured to receive an in-band range of signals. A value of N is configured to cause the interference signals corresponding to the frequency $N*f$ and harmonics thereof, to be shifted outside the in-band range of signals.

In another aspect, in a method for reducing interference signals caused by periodic peak currents a root clock having a frequency $D*f$ is received. Multiphase clocks having N phases and frequency f are derived from the root clock, N being an integer. The multiphase clocks cause a shift in the interference signals having the frequency f to a frequency $N*f$ and harmonics thereof. The multiphase clocks are provided to a communication device partitioned into N circuits, where each one of the N circuits receives a corresponding one of the multiphase clocks. State changes of the multiphase clocks provided to the N circuits are spread over the N phases to draw a reduced periodic peak current, thereby reducing the interference signals having the frequency $N*f$ and harmonics thereof.

In yet another aspect, in a method for reducing a periodic peak current drawn by N circuits multiphase clocks having N phases are derived from a root clock having a frequency $D*f$ and a single phase, the multiphase clocks having $2*N$ edges (e.g., 2 edges corresponding to a leading edge and a falling edge per phase and N phases in a time period) phased apart at least one time period of the root clock, the multiphase clocks being derived from the root clock by using a hardware description language (HDL). The multiphase clocks having the $2*N$ edges are distributed to the N circuits, where the N circuits are switched at different time instants corresponding to the $2*N$ edges spread over the N phases, thereby drawing a reduced periodic peak current compared to the peak current drawn by the N circuits switched by the derived clock having a single phase.

Other features of the embodiments will be apparent from the accompanying drawings and from the detailed description that follows.

BRIEF DESCRIPTION OF THE VIEWS OF DRAWINGS

FIG. 3A illustrates additional details of the derived clock circuit described with reference to FIG. 1 using a Gray counter.

FIG. 3B illustrates a timing diagram of the derived clock circuit described with reference to FIG. 3A.

FIG. 3C illustrates in tabular form outputs of a binary counter and the Gray counter described with reference to FIG. 3A.

FIG. 4E is a waveform illustrating periodic peak current profiles generated by the derived clock circuit having N phases described with reference to FIG. 1 that is operating in a clock phasing disabled and a clock phasing enabled status.

FIG. 6A is a flow chart of a method for reducing interference signals caused by periodic peak currents, according to one embodiment.

FIG. 6B is a flow chart of a method for deriving multiphase clocks, according to one embodiment, according to one embodiment.

FIG. 6C is a flow chart of a method for reducing a periodic peak current drawn by N circuits, according to an embodiment.

DETAILED DESCRIPTION

Figure 1:
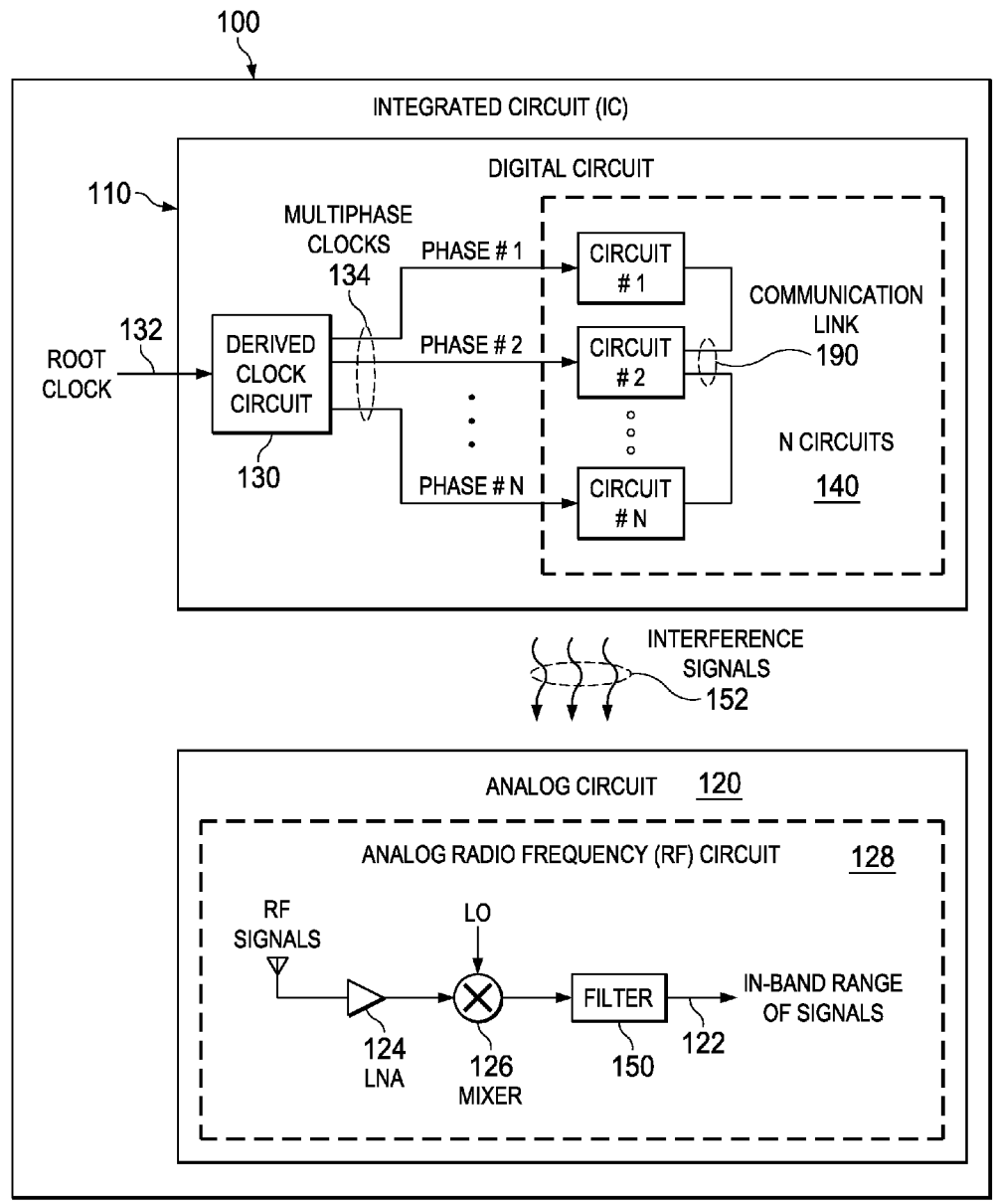
FIG. 1 illustrates a block diagram of an integrated circuit, according to one embodiment.

Methods and apparatus for reducing interference signals in an integrated circuit using multiphase clocks are disclosed. The following description is merely exemplary in nature and is not intended to limit the present disclosure, applications, or uses. It should be understood that throughout the drawings, corresponding reference numerals indicate like or corresponding parts and features. In various embodiments, configuration describes a set up of an element, a circuit, a package, an electronic device, and similar other, and refers to a process for setting, defining, or selecting particular properties, parameters, or attributes of the device prior to its use or during its use. A set of configuration attributes may be selected to have a default value. For example, a gain of an amplifier may be configured to be equal to one (1) to enable an output signal to simply track an input signal.

According to an embodiment, an apparatus and method for reducing interference signals using multiphase clocks includes an IC chip that includes a digital circuit and an analog circuit. The digital circuit includes a derived clock circuit configured to receive a root clock having a frequency D*f, D being a divide factor, divide the root clock by D, and generate multiphase clocks having N phases. N circuits of the digital circuit are configured to receive a corresponding one of the N phases, with edges of the multiphase clocks being spread over the N phases. The multiphase clocks cause a frequency shift in interference signals generated by reduced periodic peak currents drawn by the N circuits from f to N*f and harmonics thereof. The analog circuit is configured to receive an in-band range of signals. A value of N is configured to shift the interference signals outside the in-band range of signals.

FIG. 1 illustrates a block diagram of an IC 100, according to one embodiment. The IC 100 includes a digital circuit 110 configured to receive, process, and provide digital or binary signals and an analog circuit 120 configured to receive, process, and provide analog signals. Although not shown, it is understood that the IC 100 may include other components or modules, e.g., an analog-to-digital converter (ADC), a digital-to-analog converter (DAC), power distribution network, decoupling capacitors, and others. The digital circuit 110 and the analog circuit 120 may be directly or indirectly coupled.

For example, large periodic current surges associated with periodic switching activity in the digital circuit 110 may be indirectly coupled to the analog circuit 120 through chip elements such as substrate, parasitic resistance and capacitance, power distribution network, and others.

In the depicted embodiment, the digital circuit 110 is configured to include a derived clock circuit 130 and N circuits 140. The N circuits 140 may include circuit # 1, circuit # 2, and so on including circuit # N. Each of the N circuits 140 may be configured to be driven by a dedicated single clock. Each of the N circuits 140 may include sequential and combinatorial logic gate elements that are designed to switch at an instant of time corresponding to an edge of a clock, e.g., a leading edge. The N circuits 140 may be coupled to one another via one or more ones of a communication link 190.

The derived clock circuit 130 is configured to receive a root clock 132 having a frequency f, divide the root clock 132, and generate multiphase clocks 134 having N phases, N being an integer. In an embodiment, the multiphase clocks 134 may be generated to have non-aligned rising or falling edges (e.g., edges of the clocks that occur at different time instants) that may be used for switching purposes. That is, the N phases may be timed to avoid an exact alignment of rising or falling edges of the multiphase clocks 134. Additional details of the derived clock circuit 130 configured to provide the multiphase clocks 134 to the N circuits 140 are described with reference to FIGS. 4A-4C.

The multiphase clocks 134 may be configured to have a single frequency or multiple frequencies. When the multiphase clocks 134 have a single frequency, if the root clock 132 has a frequency D*f then the frequency of each one of the N phases of the multiphase clocks 134 is f, where D is a divide factor for the root clock 132, and D/N is=P, where P=separation between the N phases. In a special case when P=1, D and N are identical. Thus, each one of the multiphase clocks 134 may be configured to have the same frequency, e.g., frequency f where the frequency of the root clock 132 is configured to be D*f. The N phases of the multiphase clocks 134 may be configured to have different frequencies, e.g., f1 and f2 compared to the frequency f. Additional details of the derived clock circuit 130 configured to provide single frequency or multiple frequencies are described with reference to FIGS. 2A-2F and 3A-3C.

In an embodiment, the IC 100 may be included in a communication device such as a radio frequency (RF) communication enabled wireless device. In an embodiment, the communication device and components thereof, including the IC 100, may be placed in one of several operating modes such as normal, test/debug, high speed, low power, bypass, and others. In the test/debug mode, various performance or benchmarking tests may be performed on the IC 100 and components thereof. When operating in the test/debug mode, an operating state of the derived clock circuit 130 may be configured to be at least one of a clock phasing enabled state and a clock phasing disabled state. That is, the derived clock circuit 130 may be configured to provide the multiphase clocks 134 as an output or the derived clock circuit 130 may be configured to simply divide the root clock 132 having a frequency D*f by D and provide an aligned, single phase clock having frequency f as an output. When the IC 100 is operating in other modes such as the normal mode or low power mode or high speed mode, the derived clock circuit 130 may be automatically placed in the clock phasing enabled state. The multiphase clocks 134 having the N phases are provided to the N circuits 140 for performing signal processing, timing and control applications. That is, each one of the N circuits 140 are configured to receive a corresponding one of the multiphase clocks 134. Thus, the multiphase clocks 134 having phase #1 is coupled to circuit #1, the multiphase clocks 134 having phase #2 is coupled to circuit #2, and the multiphase clocks 134 having phase #N is coupled to circuit #N.

When the IC 100 is operating in a test/debug mode and when the derived clock circuit 130 is operating in the clock phasing disabled state, the root clock 132 (having aligned clock edges and having the frequency D*f may be simply divided by D and provided to the N circuits 140 for performing testing/debugging, signal processing, timing and control applications. A peak current having a periodic pattern (may be referred to as a periodic peak current) drawn by the digital circuit 110 at or around an edge (e.g., a leading edge) of the root clock 132 may generate undesirable interference signals 152. If the root clock 132 has a frequency D*f and the multiphase clocks 134 have the frequency f, then the interference signals 152 may have frequencies corresponding to the frequency f and harmonics thereof. More specifically, periodic peak currents in the digital circuit 110 may interfere with analog signals (e.g., radio frequency 'RF' input signals) due to coupling between the digital circuit 110 and the analog circuit 120 through power distribution network, substrate, package, board, and other parasitic elements that may be present within the IC 100. For example, the communication device that includes the IC 100 may be configured to receive frequency modulation (FM) band (e.g., 76-108 mega hertz (MHz)) signals. The performance of the FM band receiver may be degraded due to the presence of the interference signals 152 generated by periodic peak currents in the digital circuit 110.

The wireless communication device may experience performance degradation due to the interference signals generated by a particular frequency f of a derived clock that may be generated by dividing the frequency D*f of the root clock 132 by D. If the derived clock has a frequency of 20 MHz, then the $4^{th}$ and $5^{th}$ harmonic frequencies may cause performance degradation at 80 MHz and 100 MHz (both being within the FM band). Additional details of an improved performance of the IC 100 when the derived clock circuit 130 is operating in a clock phasing enabled state versus a clock phasing disabled state are described with reference to FIG. 5.

When the derived clock circuit 130 is operating in a clock phasing enabled state, the multiphase clocks 134 cause a shift in the interference signals 152 having the frequency f (fundamental and harmonics thereof) to a frequency N*f (fundamental and harmonics thereof). In addition, edges of the multiphase clocks 134 provided to the N circuits 140 are spread or distributed over the N phases, thereby causing the N circuits 140 to draw a reduced peak current (hence lower IR drop) compared to the peak current drawn in the clock phasing disabled state.

The derived clock circuit 130 provides a phased clocking scheme (in the form of the multiphase clocks 134) that enables a spread in a peak current profile as a function of time. A number of switching elements included in each one of the N circuits 140 may be balanced to achieve a uniform and distributed peak current profile. Additional details of the distribution of the peak current over the N phases are described with reference to FIGS. 4D-4E. Thus, the spread in switching activity within the N circuits 140 occurs over time period multiples of the root clock 132. This enables the decoupling capacitor a larger time to get charged between two consecutive switching activities associated with different ones of the N circuits 140. As a result, the load on the decoupling capacitor may be reduced compared to the load associated with the peak current drawn in the clock phasing disabled state. Therefore, fewer number of decoupling capacitors having a lesser capacity may be used, thereby reducing the silicon area requirements for the IC 100.

In an embodiment, the analog circuit 120 includes an analog radio frequency (RF) circuit 128 that may include an antenna to receive RF signals, a LNA 124, a mixer 126, and a filter 150 for processing the RF signals. The filter 150 may be included in the analog RF circuit 128 to allow the in-band range of signals 122 to pass through and filter out the interference signals 152. A value of N, e.g., N=3 or N=15, is configured to cause the interference signals 152 corresponding to the frequency f and harmonics thereof, to be shifted outside the in-band range of signals. It is understood that the particular value of D, P, and N selected may vary in dependence of the application. Although the interference generating effect of periodic peak currents that may occur in digital circuits is described with reference to analog and analog RF circuits, it is understood that periodic peak currents may generate interference signals in any IC chip processing mixed signals.

In an embodiment, clock generation circuits such as the derived clock circuit 132 within the IC 100 may be implemented earlier in the chip design cycle by using a hardware description language (HDL) supported by many commercially available chip synthesis tools such as Verilog. More specifically, circuit elements included in the digital circuit 110 (the root clock 132, the derived clock circuit 130, the N circuits 140) and the analog circuit 120 may be configured by using the HDL such as Verilog's register transfer level (RTL) code. It is understood that although the clock generation circuits such as the derived clock circuit 132 may be implemented by using the HDL, it is understood that use of any other tools, techniques, and/or languages for modeling, simulation, and/or synthesis of digital circuits are also contemplated.

Figure 2A:
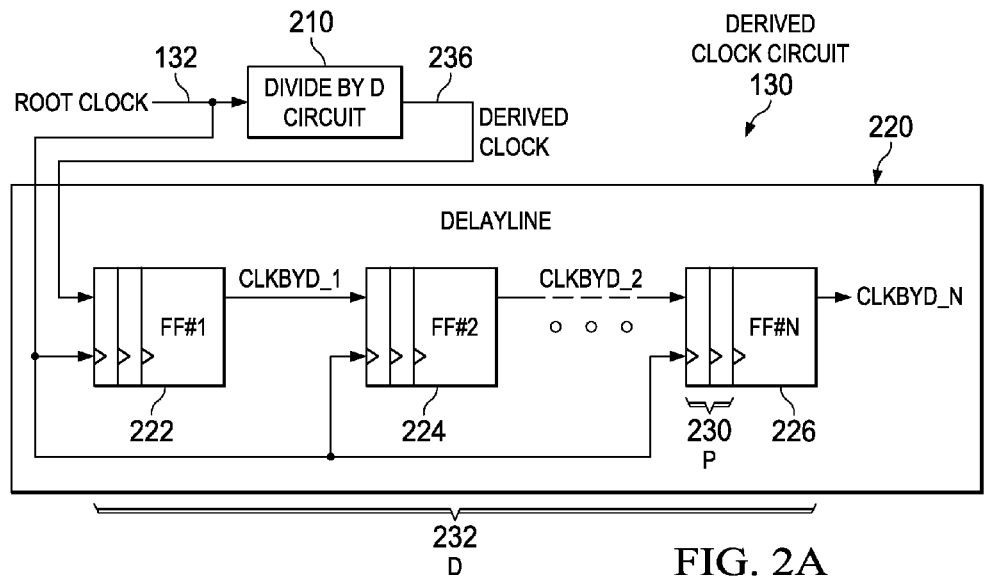
FIG. 2A illustrates additional details of the derived clock circuit described with reference to FIG. 1 using a delayline to generate multiphase clocks having a single frequency and N phases from a root clock.

FIG. 2A illustrates additional details of the derived clock circuit described with reference to FIG. 1 using a delayline 220 to generate the multiphase clocks 134 having a single frequency f and N phases from a root clock. The derived clock circuit 130 includes a divide by D circuit 210 and the delayline 220 that includes multiple FF groups coupled to receive an input that is an output of a preceding FF. In an embodiment, when the derived clock circuit 130 is operating in a clock phasing disabled state, the divide by D circuit 210 may be configured to simply divide the root clock 132 having the frequency D*f by D and generate a derived clock 236 as an output that has a single phase, has aligned edges and that may be concurrently provided to the N circuits 140. If P 230 is the total number of FF in each FF group (FF#1 222, FF#2 224 through FF#N 226) corresponding to the separation between each one of the N phases, D 232 is total number of FFs included in the delayline 220 then the single frequency of the multiphase clocks 134 is f and D=N*P.

Figure 2B:
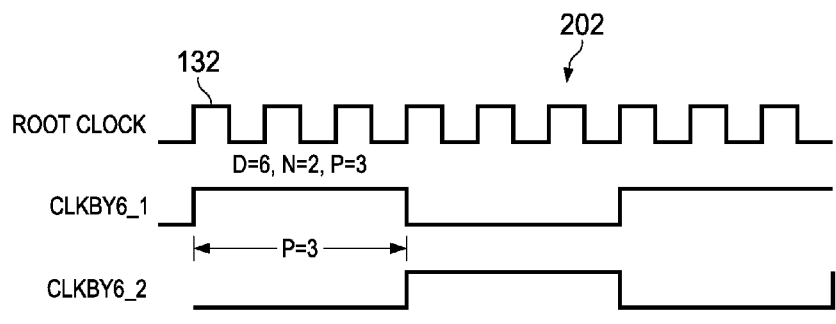
FIG. 2B illustrates a timing diagram of the derived clock circuit described with reference to FIG. 2A having D=6, P=3, and N=2.
Figure 2C:
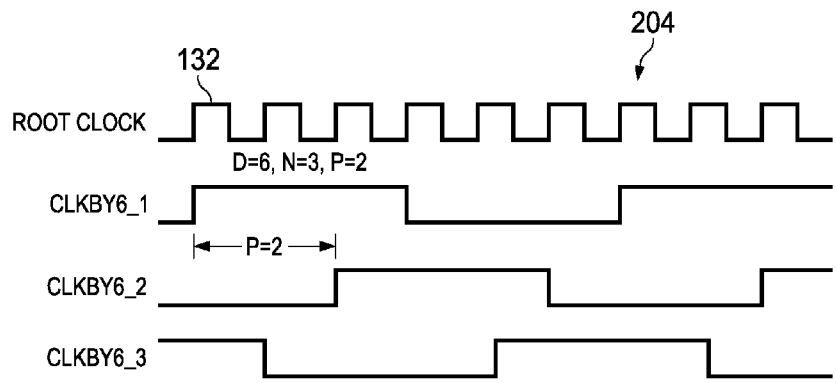
FIG. 2C illustrates a timing diagram of the derived clock circuit described with reference to FIG. 2A having D=6, P=2, and N=3.
Figure 2D:
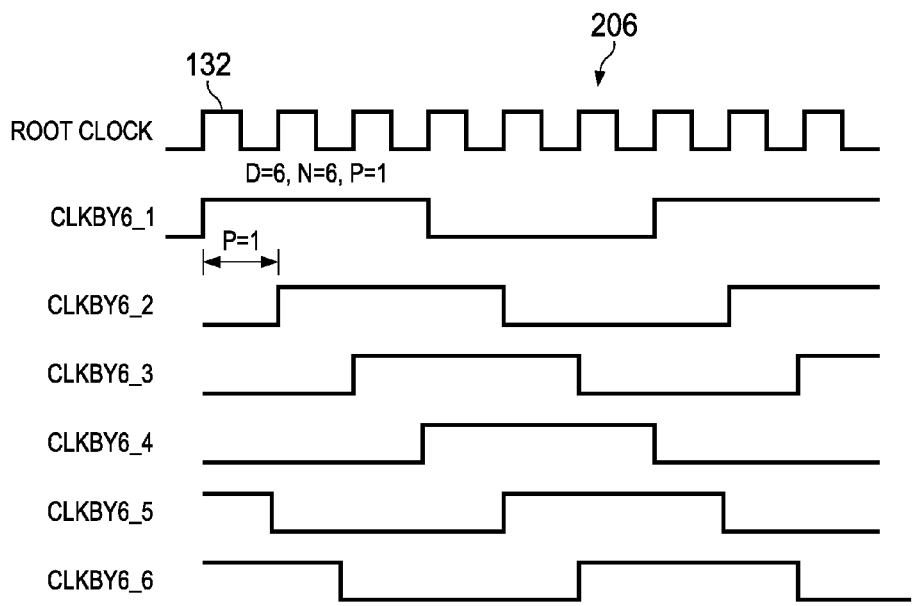
FIG. 2D illustrates a timing diagram of the derived clock circuit described with reference to FIG. 2A having D=6, P=1, and N=6.

FIG. 2B illustrates a timing diagram 202 of a derived clock circuit described with reference to FIG. 2A having D=6, P=3, and N=2. FIG. 2C illustrates a timing diagram 204 of a derived clock circuit described with reference to FIG. 2A having D=6, P=2, and N=3. FIG. 2D illustrates a timing diagram 206 of a derived clock circuit described with reference to FIG. 2A having D=6, P=1, and N=6. Referring to FIGS. 2B, 2C, and 2D, the root clock 132 is divided by 6 and the separation between the phases is varied by 3, 2 and 1 root clock cycles to generate 2, 3, and 6 phases.

Figure 2E:
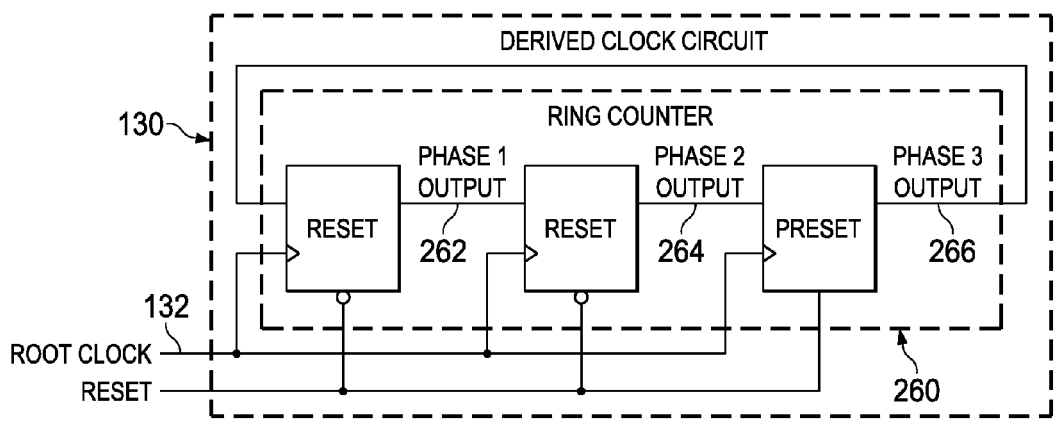
FIG. 2E illustrates additional details of the derived clock circuit described with reference to FIG. 1 using a Ring counter.
Figure 2F:
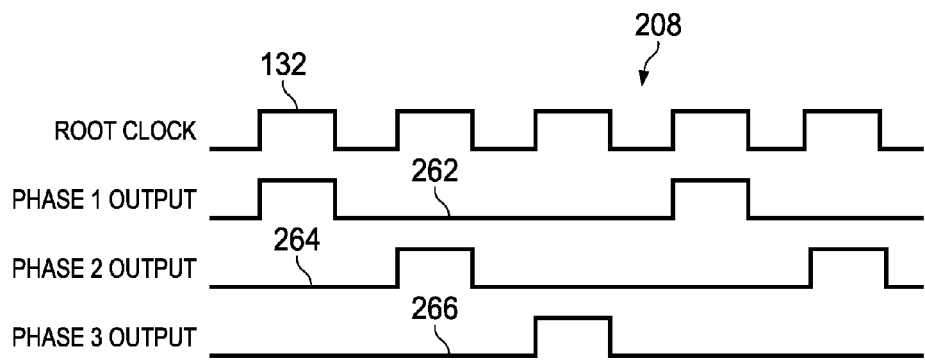
FIG. 2F illustrates a timing diagram of the derived clock circuit described with reference to FIG. 2E.

FIG. 2E illustrates additional details of the derived clock circuit described with reference to FIG. 1 using a Ring counter 260 to generate multiphase clocks 134 having a single frequency. FIG. 2F illustrates a timing diagram 208 of the derived clock circuit described with reference to FIG. 2E. Referring to FIGS. 2E and 2F, the Ring counter 260 includes N flip-flops (FFs) that receive the root clock 132 as input and provide an output that is coupled to an input of a subsequent FF in a ring or a closed loop arrangement, N representing the number of phases. In the depicted embodiment, N, D and P are configured to have a value of 3, 3 and 1 respectively. Thus, the multiphase clocks 134 generated by the Ring counter 260 includes 3 outputs provided as phase 1 output 262, phase 2 output 264, and phase 3 output 266. Each one of the 3 phases has the same frequency, which is 1/N (N=3) the frequency of the root clock 132. That is, the frequency D*f of the root clock 132 is divided by N (N=D=3 and P=1) to obtain the multiphase clocks 134 having a single frequency equal to f. The 3 leading edges and the 3 falling edges of the multiphase clocks 134 are uniformly distributed over the N=3 phases.

FIG. 3A illustrates additional details of a derived clock circuit described with reference to FIG. 1 using a Gray counter 370 to generate multiphase clocks 134 having multiple frequencies. FIG. 3B illustrates a timing diagram of a derived clock circuit described with reference to FIG. 3A. FIG. 3C illustrates in tabular form outputs of a binary counter and a Gray counter described with reference to FIG. 3A. Referring to FIGS. 3A, 3B, and 3C, the Gray counter 370 includes M D-type FFs that receive the root clock 132 as input and provide an output that is provided to a Gray-to-binary converter 372, where M is an integer and (M−1) corresponds to the number of multiple frequencies. In the depicted embodiment, M is configured to be equal to 3. A binary '1' is added to the content of the Gray-to-binary converter 372 and the output is provided to a binary-to-Gray converter 374. The output of the binary-to-Gray converter 374 is provided as an input to each one of the M D-type FFs.

In the depicted embodiment, the Gray counter 370 is used to divide the root clock 132 having a frequency f into a first multiphase clock 376 having a first frequency and P phases and a second multiphase clock 378 having a second frequency and Q phases, where P and Q are integers and P+Q is equal to N. For example, the root clock 132 may be divided by 4 to generate the first multiphase clock 376 (corresponding to 2(G1) bit of the Gray counter 370,  indicating raised to the power of) and the root clock 132 may be divided by 8 to generate the second multiphase clock 378 (corresponding to 2G2 bit of the Gray counter 370). The first multiphase clock 376 may be provided to a first one of the N circuits 140 and the second multiphase clock 378 may be provided to a second one of the N circuits 140. If the first multiphase clock 376 has P=2 phases and the second multiphase clock 378 has Q=1 phase, then the total number of phases are P+Q=3 phases. The individual bits of the Gray counter 370 (having 23 counter values) may be used to generate the multiphase clocks 134, as no two bits of the Gray counter 370 toggle at the same time, thereby avoiding concurrent clock transitions.

Figure 4A:
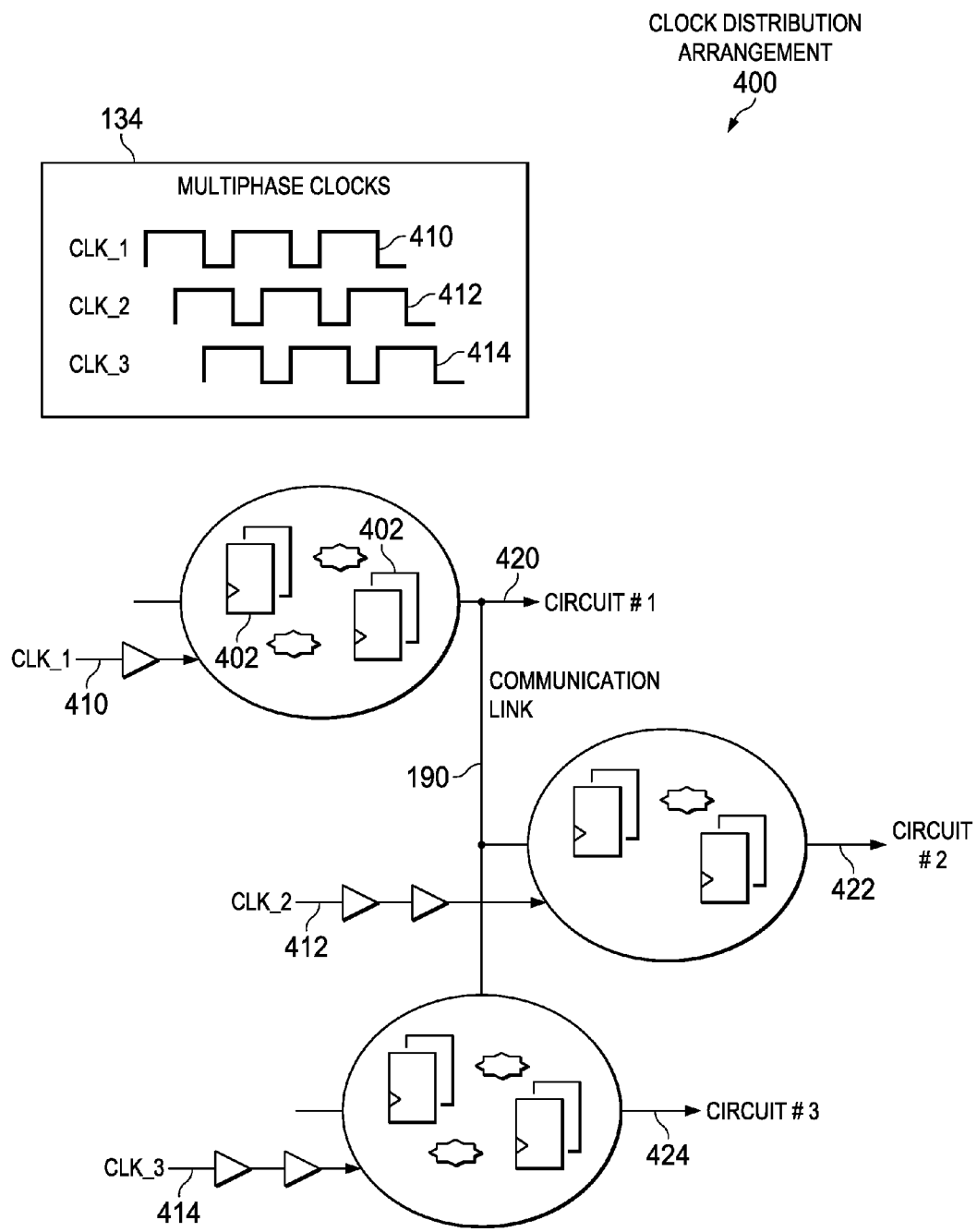
FIG. 4A illustrates a clock distribution arrangement for multiphase clocks provided to N circuits described with reference to FIG. 1.
Figure 4B:
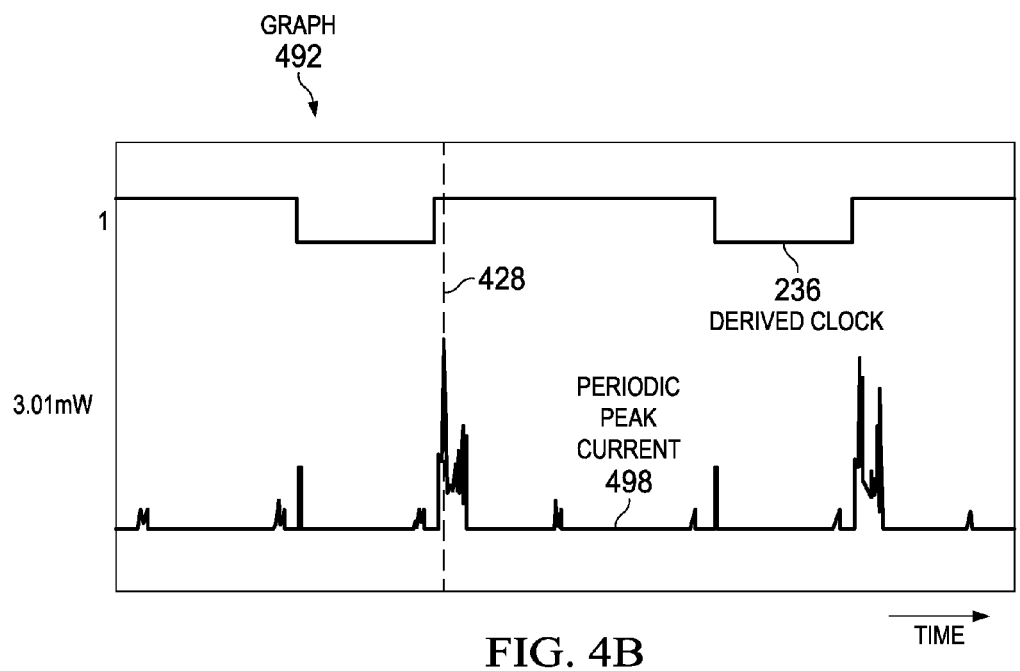
FIG. 4B is a graph illustrating distribution of periodic peak current driven by a derived clock having a single phase.
Figure 4C:
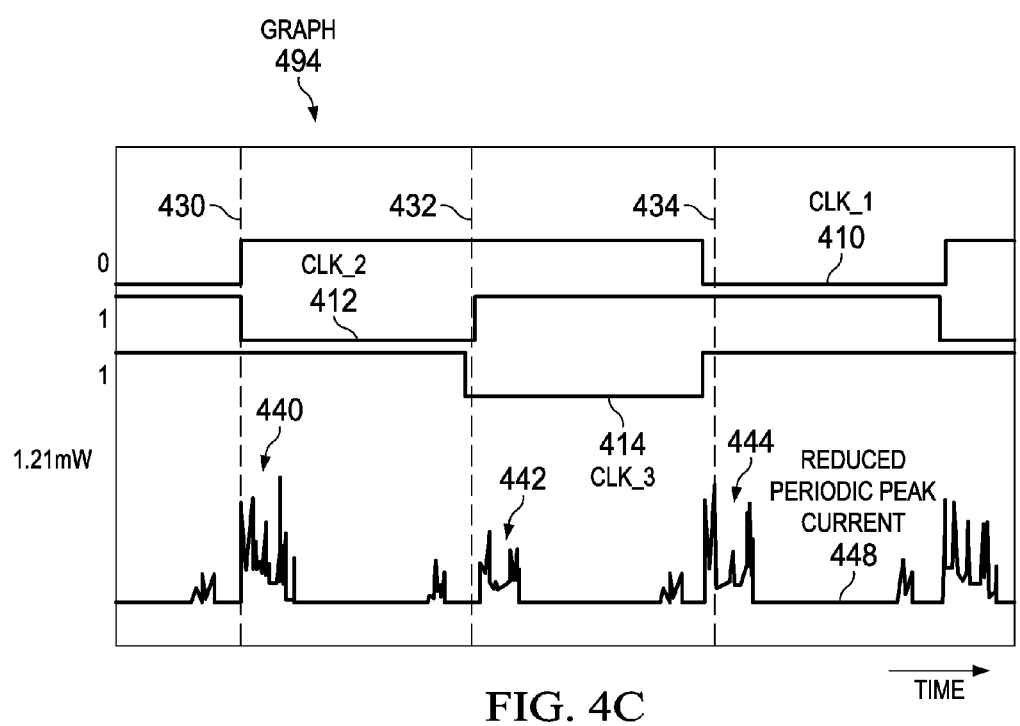
FIG. 4C is a graph illustrating distribution of periodic peak current using the clock distribution arrangement described with reference to FIG. 4A having N phases.

Depending on the application requirements to reduce interference signals from a particular frequency and harmonics thereof, various tradeoffs may exist between selecting frequency values, the divide factor D, and the number of phases for the selected frequencies. In a particular application it may be desired to reduce interference signals corresponding to a root clock having a frequency D*f. FIG. 4A illustrates a clock distribution arrangement 400 for multiphase clocks provided to N circuits described with reference to FIG. 1. FIG. 4B is a graph 492 illustrating distribution of periodic peak current driven by the derived clock 236 having a single phase. FIG. 4C is a graph 494 illustrating distribution of periodic peak current using the clock distribution arrangement described with reference to FIG. 4A having N phases. Referring to FIG. 4A, the multiphase clocks 134 includes CLK_1 410, CLK_2 412, and CLK_3 414 as the N phases (N=3) that are provided to circuit #1 420, circuit #2 422, and circuit #3 434 (included in the N circuits 140) respectively. Each one of the CLK_1 410, CLK_2 412, and CLK_3 414 clocks has a single frequency. Referring to FIG. 4B, the derived clock circuit 130 is operating in the clock phasing disabled state, e.g., during IC test mode operation, which enables the root clock 132 to be simply divided by D to generate the derived clock 236 as an output that has a single phase, has aligned edges and that is concurrently provided to the N circuits 140. At time t00 428 on graph 492, coinciding with a leading edge of the root clock 132, a large periodic peak current 498 is drawn by the N circuits 140 as the switching components included therein are concurrently switched on at or around a leading clock edge.

Referring to FIG. 4C, the derived clock circuit 130 is operating in the clock phasing enabled mode, e.g., when IC 100 is operating in a normal mode, which enables the multiphase clocks 134 having the N phases provided to the N circuits 140 respectively. At time t0 430 on graph 492, the CLK_1 410 changes state from a logic low to a logic high level. Coinciding with a leading edge of the CLK_1 410, switching activity occurs within circuit #1 420, and a first peak current 440 is drawn by the circuit #1 420. At time t1 432, the CLK_2 412 changes state from a logic low to a logic high level. Coinciding with a leading edge of the CLK_2 412, switching activity occurs within circuit #2 422, and a second peak current 442 is drawn by the circuit #2 422. Similarly, at time t2 434, the CLK_3 414 changes state from a logic low to a logic high level. Coinciding with a leading edge of the CLK_3 414, switching activity occurs within circuit #3 424, and a third peak current 444 is drawn by the circuit #3 424. The peak current cycle is repeated during the subsequent clock cycles. In the depicted embodiment, a reduced periodic peak current 448 includes the first peak current 440, the second peak current 442, and the third peak current 444.

Referring to FIGS. 4A, 4B, and 4C, as described earlier, each one of the N circuits 140 may include switching elements 402 such as combinatorial and sequence logic gate elements that may be designed to switch at an instant of time corresponding to an edge of a clock. The circuit #1 420, circuit #2 422, and circuit #3 434 may be coupled to one another via one or more ones of the communication link 190. Typically, many switching elements 402 switch or change state in a short interval of time at or around the instant when the clock switches, e.g., during a leading or trailing edge of a clock. Switching elements 402 such as clock tree buffers, FFs, and a first level of logic at the FF output may fall in this category. The rest of the switching activity within the N circuits 140 may occur in the remaining logic of the circuit and this switching may be typically spread over time and hence may not result in any significant current peak.

The inter-circuit data transfer over the communication link 190, e.g., between any two of the N circuits 140, is preferably made as a flop-to-flop handoff to aid timing closure. All intra-circuit data handoff, e.g., data transfer within any one of the N circuits 140, may be considered as single derived clock cycle. When operating the IC 100 in a test mode for at-speed testing, testing of N circuits 140 may be performed in two separate steps: intra-circuit testing step for testing each one of the N circuits 140 and inter-circuit testing step for testing logic and timing shared between multiple ones of the N circuits 140.

The clock distribution arrangement 400 providing the multiphase clocks 134 to the multitude of switching elements 402 is designed to distribute the total switching activity occurring within the N circuits 140. That is, the switching activity is distributed over a broader interval of time rather than during a leading edge of a clock. Thus, the clock distribution arrangement 400 avoids having a common global or root clock used by all the N circuits 140 in a concurrent manner by operating the derived clock circuit 130 in a clock phasing enabled state. In the clock distribution arrangement 400, the rising and falling edges of the different phased clocks of the multiphase clocks 134 appear at different instants of time although the frequency of each phased clock may remain the same.

Another technique used for generating a balanced the peak current profile is to include substantially equal number of switching elements in each of the N circuits 140 to enable them to draw substantially equal amounts of the reduced periodic peak current 448, (e.g., equal amounts of the first peak current 440, the second peak current 442, and the third peak current 444). A reduction in the reduced periodic peak current 448 relative to the periodic peak current 498 causes a corresponding reduction in the interference signals 152.

Figure 4D:
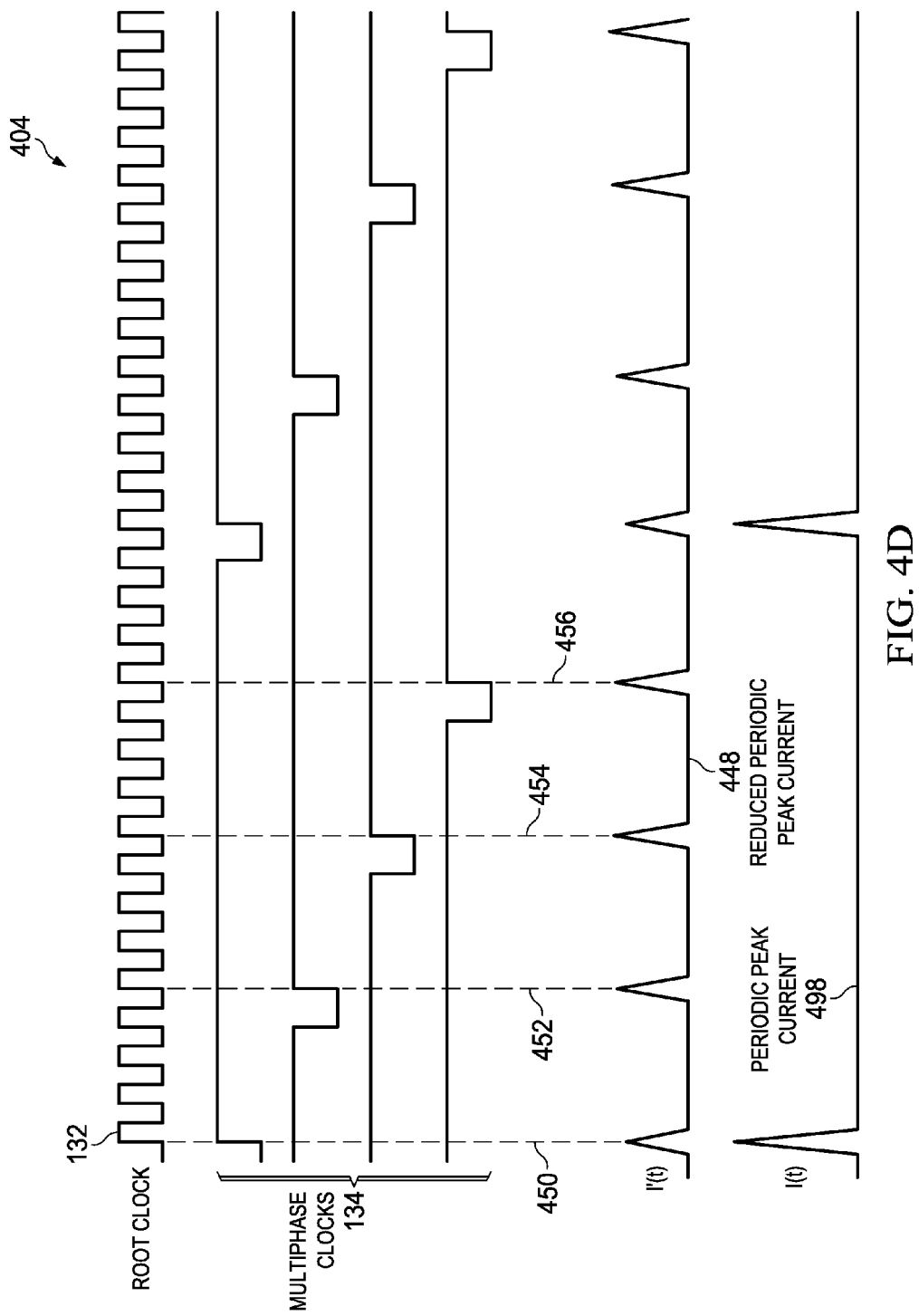
FIG. 4D is a waveform illustrating periodic peak current profiles generated by the derived clock circuit having 4 phases described with reference to FIG. 1 that is operating in a clock phasing disabled and a clock phasing enabled status.

FIG. 4D is a waveform 404 illustrating periodic peak current profiles generated by the derived clock circuit 130 having 4 phases described with reference to FIG. 1 that is operating in a clock phasing disabled and a clock phasing enabled status. The derived clock circuit 130 receives the root clock 132 having a frequency D*f (D=16) and generates the multiphase clocks 134 having 4 phases (N=4) and having a single frequency equal to f and P=4. At time t10 450, when the derived clock circuit 130 is operating in a clock phasing disabled state, the N circuits 140 coupled to the derived clock circuit 130 draw a periodic peak current 498 that has a greater amplitude compared to a reduced periodic peak current 448 drawn by the N circuits when the derived clock circuit 130 is operating in a clock phasing enabled status. A reduction in an average value of the amplitude of the periodic peak current occurs since only a portion of the N circuits, e.g., circuit coupled to receive a first one of N phases, draw the peak current. At times t11 452, t12 454, and t13 456, coinciding with a leading edge of the multiphase clocks 134, corresponding ones of the N circuits 140 draw the reduced periodic peak current 448. The peak current cycle repeats after P*N*(f) cycles of the root clock 132. Additional details of computing a reduction in periodic peak currents are described with reference to FIG. 4E.

FIG. 4E is a waveform 406 illustrating periodic peak current profiles generated by the derived clock circuit 130 having N phases described with reference to FIG. 1 that is operating in a clock phasing disabled and a clock phasing enabled status. In an embodiment, the derived clock 236 has a time period T 470 and frequency f. The multiphase clocks 134 have N phases and each of the N phases has the same frequency. Each one of the N phases is separated by a fixed number of root clock cycles with respect to a reference phase. That is, time difference between a first phase clock and the reference phase is Δ1 472, time difference between a second phase clock and the reference phase is Δ2 474, and time difference between an Nth phase clock and the reference phase is Δn.

When the derived clock circuit 130 is operating in a clock phasing disabled condition, an amplitude of the periodic peak current 498 I(t) is computed in the time and frequency domain by Equations 100 and 102 respectively:

$$I(t)=a_0 \cdot i(t) + \ldots + a_N \cdot i(t) \qquad \text{Equation 100}$$

In frequency domain, $$I(f)=i(f)[a_0+a_1+\ldots+a_N] \qquad \text{Equation 102}$$

When the derived clock circuit 134 is operating in a clock phasing enabled condition, an amplitude of the reduced periodic peak current 448 I'(t) is computed in the time and frequency domain by Equations 104 and 106 respectively:

$$I'(t)=a_0 \cdot i(t)+a_1 \cdot i(t-\Delta_1)+\ldots+a_N \cdot i(t-\Delta_N) \qquad \text{Equation 104}$$

In frequency domain, $$I'(f)=i(f)[a_0+a_1 e^{-jw\Delta_N}] \qquad \text{Equation 106}$$

From Equations 100, 102, 104 and 106, the relationship between the reduced periodic peak current 448 I'(f) and the periodic peak current 498 I(f) is shown in Equation 108 as follows:

$$|I'(f)| \le |I(f)| \qquad \text{Equation 108.}$$

To simplify computations, assuming N=3 phases and eliminating the impact of decaps on circuit performance, a frequency domain representation of the periodic peak current profile (with clock phasing disabled and clock phasing enabled condition) is respectively made as follows:

$$I(f)=i(f)[a_0+a_1+a_2] \qquad \text{Equation 110}$$

$$I'(f)=i(f)[a_0+a_1 e^{-jw\Delta_1}+a_2 e^{-jw\Delta_2}] \qquad \text{Equation 112.}$$

A reduction in amplitude of interference signals 152 at harmonics may be computed by Equations 114 and 116:

$$\text{Angular frequency } \omega=2*\pi*n*f \qquad \text{Equation 114}$$

$$\text{Gain } G(f)=|I(f)|/|I'(f)| \qquad \text{Equation 116.}$$

In Equation 116, substituting for I(f) and I'(f) from Equations 110, 112, the gain G(f) at harmonics of frequency f may be expressed by Equation 116 as follows:

$$\text{Gain } G(f) = \frac{|a_0+a_1+a_2|}{|a_0+a_1 e^{-j2*\Pi*n*f*\Delta_1}+a_2 e^{-j2*\Pi*n*f*\Delta_2}|}. \qquad \text{Equation 118}$$

To achieve optimum performance for the IC 100, it may be desirable to provide maximum attenuation for harmonic frequencies of the derived clock 236. This may be achieved if I'(f) is equal to 0, which translates to:

$$a0=a1=a2 \qquad \text{Equation 120}$$

$$a_0+a_1 e^{-j2*\Pi*n*f*\Delta_1}+a_2 e^{-j2*\Pi*n*f*\Delta_2}=0 \qquad \text{Equation 122}$$

Thus, in order to optimize performance for the IC 100, the 3 phases of the multiphase clocks 134 may be spread uniformly around a unit circle (e.g., 360/N or 120 degrees apart when N=3), and in the time domain, it would be desirable to have equal amplitudes of the reduced peak currents that are equally spaced apart as a function of time.

Figure 5:
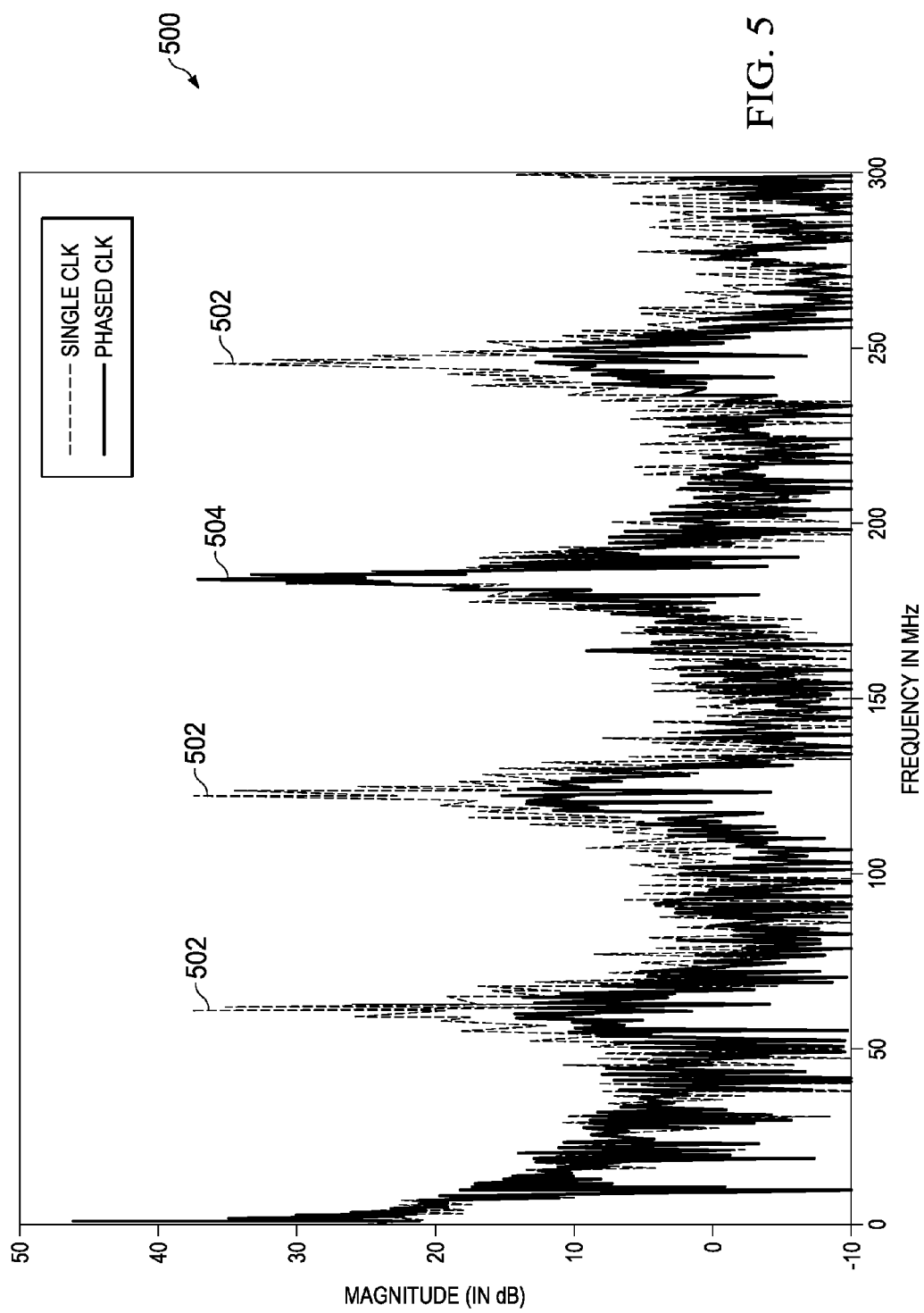
FIG. 5 is a graph illustrating a power spectral density (PSD) versus frequency response of an analog circuit described with reference to FIG. 1.

FIG. 5 is a graph 500 illustrating a power spectral density (PSD) versus frequency response of the analog circuit 120 described with reference to FIG. 1. Magnitude (in dB) of the PSD is shown on Y-axis and frequency of the interference signals 152 is shown on X-axis (in MHz). The graph 500 includes a graph 502 representing the PSD response when the derived clock circuit 130 is operating in a clock phasing disabled condition and the frequency f of the derived clock 236 is configured to be equal to 60 MHz, as described with reference to FIG. 4B. The graph 500 also includes a graph 504 representing the PSD response when the derived clock circuit 130 is operating in a clock phasing enabled condition and the frequency f of each phase of the multiphase clocks 134 is configured to be equal to 60 MHz (in this case the frequency of the root clock 132 is 3*60 MHz or 180 MHz). The graph 504 illustrates that amplitude of the interference signals 152 within the in-band range of signals (e.g., 76-108 MHz) at f (60 MHz) and 2*f (120 MHz) frequencies are suppressed relative to the suppression illustrated in graph 502. The graph 504 illustrates that the interference signals 152 have been shifted and have 3*f (180 MHz) frequency (which lie outside the in-band range of signals).

FIG. 6A is a flow chart of a method 600 for reducing interference signals caused by periodic peak currents, according to one embodiment. In an embodiment, the method 600 is used for reducing interference signals caused by periodic peak currents occurring in the IC 100 described with reference to FIG. 1. At step 610, a root clock having a frequency D*f is received. At 620, multiphase clocks having N phases are derived from the root clock, N being an integer, where the multiphase clocks cause a shift in the interference signals having the frequency f to a frequency N*f and harmonics thereof. At 630, the multiphase clocks are provided to a communication device partitioned into N circuits, where each one of the N circuits receives a corresponding one of the multiphase clocks. At 640, state changes of the multiphase clocks provided to the N circuits are spread over the N phases to draw a reduced periodic peak current, thereby reducing the interference signals having the frequency N*f and harmonics thereof.

It is understood, that various steps described above may be added, omitted, combined, altered, or performed in different order. For example, step 620 may be expanded to include sub steps described with reference to FIG. 6B.

FIG. 6B is a flow chart of a method 602 for deriving multiphase clocks, according to one embodiment. At step 6202, an in-band range of signals for the communication device is configured. At step 6204, a value for the N is configured, the value being configured to cause the interference signals corresponding to the frequency N*f and harmonics thereof, to be shifted outside the in-band range. It is understood, that various steps described above may be added, omitted, combined, altered, or performed in different order.

FIG. 6C is a flow chart of a method 604 for reducing a periodic peak current drawn by N circuits, according to an embodiment. In an embodiment, the method 604 is used for reducing periodic peak currents occurring in the IC 100 described with reference to FIG. 1. At step 650, multiphase clocks having N phases are derived from a root clock having a frequency D*f and a single phase, the multiphase clocks having 2*N edges (e.g., 2 edges corresponding to a leading edge and a falling edge per phase and N phases in a time period) phased apart at least one time period of the root clock, the multiphase clocks being derived from the root clock by using a hardware description language (HDL). At step 660, the multiphase clocks having the 2*N edges are distributed to the N circuits, where the N circuits are switched at different time instants corresponding to the 2*N edges spread over the N phases, thereby drawing a reduced periodic peak current compared to the peak current drawn by the N circuits switched by the derived clock. It is understood, that various steps described above may be added, omitted, combined, altered, or performed in different order.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, electronic and/or electrical circuits (e.g., application specific integrated circuit (ASIC), programmable logic devices such as field-programmable gate array (FPGA), and others). Although the present embodiments have been described with reference to specific example embodiments, it will be evident that various modifications and changes may be made to these embodiments without departing from the broader spirit and scope of the various embodiments. For example, the present embodiments are discussed in terms of an FM receiver. However, the present embodiments can be applied to any communication system for processing in-band signals. In the claims, unless otherwise indicated the article 'a' is to refer to 'one or more than one'.

What is claimed is:

1. An integrated circuit (IC) comprising:
a digital circuit comprising:
a derived clock circuit configured to receive a root clock having a frequency D*f and a single phase, wherein D is a divide factor for the root clock, wherein the derived clock circuit is configured to divide the root clock by D and generate multiphase clocks having N phases, N and D being positive integers, wherein the multiphase clocks cause a shift in interference signals to have a frequency N*f and harmonics thereof;
N circuits configured to receive a corresponding one of the multiphase clocks, wherein edges of the multiphase clocks provided to the N circuits are spread over the N phases, wherein the interference signals having the frequency N*f and harmonics thereof, are generated by a reduced periodic peak current drawn by the N circuits; and
an analog circuit configured to receive an in-band range of signals, wherein a value of N is configured to cause the interference signals corresponding to the frequency N*f and harmonics thereof, to be shifted outside the in-band range of signals;
wherein the multiphase clocks have the frequency f and the N phases, wherein D=N'P, P being equal to a separation between the N phases;
wherein the derived clock circuit further comprises:
a Gray counter configured to divide the root clock and generate the multiphase clocks having multiple frequencies, wherein no two bits of the Gray counter toggle at a time.

2. The IC of claim 1, wherein the analog circuit comprises:
a filter to filter the interference signals corresponding to the frequency N*f and harmonics thereof, wherein the filter enables the in-band range of signals to pass through.

3. The IC of claim 1, wherein the derived clock circuit further comprises:
a Ring counter configured to divide the root clock and generate the multiphase clocks having the frequency f and the N phases.

4. The IC of claim 1, wherein circuit elements included in the root clock, the derived clock circuit, and the N circuits are configured by using a hardware description language (HDL).

5. The IC of claim 1, wherein circuit elements included in each one of the N circuits are load balanced to draw a substantially equal amplitude of the reduced periodic peak current.

6. The IC of claim 1, wherein the reduced periodic peak current is less than a periodic peak current drawn by the N circuits in response to the derived clock circuit operating in a clock phasing disabled state, the reduced peak current being equal to the periodic peak current divided by N.

7. The IC of claim 1, wherein the N phases are equally spaced as a function of time.

8. The IC of claim 1, wherein the derived clock circuit further comprises:
a divide by D circuit configured to divide the root clock by the divide factor D; and a delayline configured to generate the multiphase clocks having a frequency f and the N phases.

9. The IC of claim 1, wherein a phase difference between adjacent ones of the N phases is configured to be equal to 360/N degrees.

10. An integrated circuit (IC) comprising:
a digital circuit comprising:
- a derived clock circuit configured to receive a root clock having a frequency D*f and a single phase, wherein D is a divide factor for the root clock, wherein the derived clock circuit is configured to divide the root clock by D and generate multiphase clocks having N phases, N and D being positive integers, wherein the multiphase clocks cause a shift in interference signals to have a frequency N*f and harmonics thereof;
- N circuits configured to receive a corresponding one of the multiphase clocks, wherein edges of the multiphase clocks provided to the N circuits are spread over the N phases, wherein the interference signals having the frequency N*f and harmonics thereof, are generated by a reduced periodic peak current drawn by the N circuits; and
- an analog circuit configured to receive an in-band range of signals, wherein a value of N is configured to cause the interference signals corresponding to the frequency N*f and harmonics thereof, to be shifted outside the in-band range of signals;

wherein the multiphase clocks have the frequency f and the N phases, wherein D=N*P, P being equal to a separation between the N phases;

wherein the derived clock circuit further comprises: a Gray counter configured to divide the root clock and generate the multiphase clocks having multiple frequencies, wherein no two bits of the Gray counter toggle at a time.

11. The IC of claim 10, wherein the multiphase clocks having the multiple frequencies comprises:
a first multiphase clock having a first frequency and P phases, P being an integer; and
a second multiphase clock having a second frequency and Q phases, Q being an integer, wherein P+Q is equal to N.

* * * * *